(12) United States Patent
Gilleran

(10) Patent No.: US 10,132,084 B2
(45) Date of Patent: Nov. 20, 2018

(54) SINGLE WALL DUCT FLASHING PANEL

(71) Applicant: WJG, LLC, Las Vegas, NV (US)

(72) Inventor: William J. Gilleran, Las Vegas, NV (US)

(73) Assignee: WJG, LLC, Las Vegas, NV (US)

( * ) Notice: Subject to any disclaimer, the term of this patent is extended or adjusted under 35 U.S.C. 154(b) by 0 days.

(21) Appl. No.: 15/478,994

(22) Filed: Apr. 4, 2017

(65) Prior Publication Data

US 2017/0204601 A1 Jul. 20, 2017

Related U.S. Application Data

(63) Continuation of application No. 14/977,023, filed on Dec. 21, 2015, now abandoned, which is a continuation of application No. 14/203,218, filed on Mar. 10, 2014, now abandoned.

(60) Provisional application No. 61/798,045, filed on Mar. 15, 2013.

(51) Int. Cl.
*E04D 13/147* (2006.01)
*F16L 5/10* (2006.01)
*E04D 13/17* (2006.01)

(52) U.S. Cl.
CPC ......... *E04D 13/1476* (2013.01); *E04D 13/17* (2013.01); *F16L 5/10* (2013.01)

(58) Field of Classification Search
CPC . E04D 13/1473; E04D 13/1476; E04D 13/17; E04D 13/172; E04B 1/7069; E04B 1/7076; F16L 5/10
See application file for complete search history.

(56) References Cited

U.S. PATENT DOCUMENTS

| | | |
|---|---|---|
| D791,068 S | 5/1905 | Baker |
| 2,800,850 A | 7/1957 | McKann |
| 2,985,465 A | 5/1961 | Church |
| 3,371,503 A | 3/1968 | Perez |
| 3,438,219 A | 4/1969 | Brugler |
| 3,611,743 A | 10/1971 | Manganaro |
| 3,651,245 A | 3/1972 | Moll |
| 3,683,305 A | 4/1972 | Gray |
| 3,936,589 A | 2/1976 | Teeters et al. |
| 3,955,701 A | 3/1976 | Fisch |
| 4,088,730 A | 5/1978 | Wilde |
| 4,102,090 A | 7/1978 | Anguish |
| 4,135,337 A | 1/1979 | Medlin |
| 4,175,402 A | 11/1979 | Hile |
| 4,296,870 A | 10/1981 | Balkwill et al. |
| 4,473,244 A | 9/1984 | Hill |
| 4,526,407 A | 7/1985 | Kifer |

(Continued)

*Primary Examiner* — Andrew J Triggs
(74) *Attorney, Agent, or Firm* — Stetina Brunda Garred and Brucker

(57) ABSTRACT

A duct flashing panel configured to provide weatherproofing for single wall ducts extending through the walls of a structure and having a terminal end extending outside of the structure. The duct flashing panel includes a panel body and an elastomeric collar sized and configured to circumferentially engage the exterior surface of the duct to form a fluid-tight seal between the duct and the collar to prevent fluid migration along the exterior of the duct. The collar includes an annular bead which provides rigidity and strength to the collar to urge the collar into compressive engagement with the exterior surface of the duct.

13 Claims, 3 Drawing Sheets

(56) References Cited

U.S. PATENT DOCUMENTS

| | | |
|---|---|---|
| 4,569,458 A | 2/1986 | Horsley |
| 4,570,943 A * | 2/1986 | Houseman .......... E04D 13/1471 277/606 |
| 4,607,469 A | 8/1986 | Harrison |
| 4,673,097 A | 1/1987 | Schuldt |
| 4,757,158 A | 7/1988 | Lentz |
| 4,794,207 A | 12/1988 | Norberg et al. |
| 4,874,189 A | 10/1989 | Gardner |
| 4,903,997 A | 2/1990 | Kifer |
| 4,924,032 A | 5/1990 | Akins |
| 4,927,039 A | 5/1990 | McNab |
| 4,952,752 A | 8/1990 | Roun |
| 4,952,754 A | 8/1990 | Rye |
| 4,965,971 A | 10/1990 | Jean-Jacques et al. |
| 5,012,043 A | 4/1991 | Seymour |
| 5,064,386 A | 11/1991 | Dale et al. |
| 5,171,939 A | 12/1992 | Shottey |
| 5,199,784 A | 4/1993 | Hempleman |
| 5,224,673 A | 7/1993 | Webb |
| 5,246,255 A | 9/1993 | Forbes et al. |
| 5,297,665 A | 2/1994 | Rath, Jr. |
| 5,309,579 A | 5/1994 | Nelson |
| 5,402,902 A | 4/1995 | Bouley |
| 5,478,032 A | 12/1995 | Miller |
| 5,526,619 A | 6/1996 | Vagedes |
| 5,664,955 A | 9/1997 | Arnett |
| 5,740,936 A | 4/1998 | Nash |
| 5,803,508 A | 9/1998 | Lowella |
| D399,829 S | 10/1998 | Reed |
| 5,886,295 A | 3/1999 | Carino et al. |
| 5,918,431 A | 7/1999 | Schiedegger et al. |
| 5,931,325 A | 8/1999 | Filipov |
| 5,946,863 A | 9/1999 | Bullard |
| 5,965,844 A | 10/1999 | Lippa |
| 6,230,510 B1 | 5/2001 | Price |
| 6,239,365 B1 | 5/2001 | McEvers |
| 6,378,910 B1 | 4/2002 | Maiman |
| 6,384,334 B1 | 5/2002 | Webb |
| 6,395,984 B1 | 5/2002 | Gilleran |
| 6,404,132 B1 | 7/2002 | Krumholz |
| 6,429,371 B2 | 8/2002 | Schiedegger et al. |
| 6,534,709 B2 | 3/2003 | English |
| 6,543,186 B2 | 4/2003 | Gilleran |
| 6,608,253 B1 | 8/2003 | Rintz |
| 6,649,835 B2 | 11/2003 | Gilleran |
| 6,668,852 B1 | 12/2003 | Williamson |
| 6,774,307 B2 | 8/2004 | Kruse et al. |
| 6,860,070 B2 | 3/2005 | Gilleran |
| 7,305,801 B2 | 12/2007 | Gilleran |
| 7,640,699 B2 | 1/2010 | Gilleran |
| 7,755,005 B2 | 7/2010 | Johnston et al. |
| 2014/0260044 A1* | 9/2014 | Gilleran .................... F16L 5/10 52/506.1 |
| 2016/0108611 A1* | 4/2016 | Gilleran .................... F16L 5/10 52/58 |
| 2017/0204601 A1* | 7/2017 | Gilleran .............. E04B 1/68803 |

* cited by examiner

SINGLE WALL DUCT FLASHING PANEL

CROSS-REFERENCE TO RELATED APPLICATIONS

This application is a continuation of U.S. patent application Ser. No. 14/977,023, filed Dec. 21, 2015, which is a continuation of U.S. patent application Ser. No. 14/203,218, filed Mar. 10, 2014, which claims the benefit of U.S. Provisional Application No. 61/798,045, filed Mar. 15, 2013, the contents of which are expressly incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to a moisture barrier, and more specifically to a moisture barrier flashing panel configured to mitigate moisture migration along the outside surface of a large diameter single wall duct, such as heating, ventilation and air conditioning (HVAC) duct, to provide consistent weatherproofing of the duct.

2. Description of the Related Art

In the construction of homes, commercial buildings, and the like, various utility/plumbing pipes, such as water pipes, gas pipes, drain pipes and heating, ventilation and air conditioning (HVAC) ducts extend through the walls of the building and terminate exterior of the building so as to be accessible by a user. When exteriorly terminated, these pipes and ducts extend through insulation, between wall boards, potentially within ceiling and floor structures, and in other critical places where a dry environment is extremely important for both structural and safety considerations.

The exteriorly exposed pipe or duct are periodically subjected to water sources, whether from rain, snow, lawn sprinklers, vandalism or other sources. Such water has a natural tendency to travel along the exterior of the pipe or duct for attempted entry into the building structure. If such water enters through the exterior building wall, it can cause substantial damage to insulation, dry wall, wood moldings, flooring and/or carpeting on the interior of the building.

The importance of attempting to mitigate water entry through such ducts has been recognized by the building industry with various attempts being made to prevent such interior migration of water. One presently employed approach utilizes caulking material applied at the interface of the pipe or duct with weather resistant barrier (WRB) and or housewrap or building paper disposed immediately behind the duct. Thereafter, stucco or other exterior finish material is applied over the WRB or paper to be adjacent the exposed pipe or duct length while allowing the end to be exteriorly accessible. Over time, however, such caulking can eventually crack and break, and when this occurs, water can freely travel along the exterior surface of the pipe or duct and into the interior of the building structure.

A second common approach is individually performed at every pipe or duct outlet on a job site and entails hand measuring and cutting of sheet metal to create flashing, which is thereafter fitted around the opening thereof, nailed in place and caulked. Once again, although this approach can work initially, the caulking material may eventually give way or may not initially caulk properly, which may allow water to travel along the pipe or duct exterior and into the structure.

In view of the foregoing, there is an apparent need in the art for a weatherproofing solution for single wall ducts, particularly larger diameter ducts, which mitigates installation error and generally lasts for the life of the building. Various aspects of the present invention addresses this particular need, as will be discussed in more detail below.

BRIEF SUMMARY OF THE INVENTION

According to an aspect of the present invention, there is provided a duct flashing panel configured to provide weatherproofing for large diameter single wall duct, such as heating, ventilation and air conditioning (HVAC) duct, extending through the outside walls of a structure. The duct flashing panel includes a panel body and an elastomeric or plastic seal collar sized and configured to circumferentially engage the exterior surface of the duct to form a substantially fluid-tight seal between the exterior surface of the duct and the collar to prevent fluid migration along the duct. The collar includes an annular bead which provides rigidity and strength to the collar to urge the collar into compressive engagement with the exterior surface of the single wall duct.

The panel body includes a first surface, an opposing second surface, and a panel opening extending through the panel body between the first and second surfaces. The resilient collar is coupled to the panel body and extends radially inward into the panel opening, with the collar defining a collar opening aligned with the panel opening. The collar is sized and configured to be extendable and engageable with an exterior surface of a single wall duct and to exert a compressive force thereon.

The duct flashing panel may be particularly suitable for single wall ducts defining a larger diameter, such as heating, ventilation and air conditioning (HVAC) ducts. The configuration of the collar, particularly the annular bead, easily creates and sustains a substantially fluid-tight engagement between the collar and the single wall duct when the duct is inserted through the collar.

The collar may be transitional between a relaxed configuration and a compressive configuration, wherein the collar transitions from the relaxed configuration toward the compressive configuration in response to insertion of the large diameter single wall duct through the collar.

The duct flashing panel may be configured for use with construction-grade WRB or housewrap or building paper. The duct flashing panel may be interposed between two sheets of WRB or paper sheets (e.g., a rear paper sheet and a front paper sheet). Each sheet of WRB or paper may include an aperture aligned with the collar aperture to allow for advancement of the single wall duct through the apertures.

According to another aspect of the invention, there is provided a flashing kit for use with single wall ducts, the flashing kit includes a flashing panel, and first and second sheets. The first sheet includes a first opening extending therethrough, with the first sheet being placeable adjacent the first surface of the panel body. The second sheet includes a second opening extending therethrough, with the second sheet being placeable adjacent the second surface of the panel body.

In accordance with yet another embodiment, there is provided method of installing a flashing panel over a duct.

The method includes providing a flashing panel and advancing the flashing panel over the duct, with the duct extending through the collar opening and the collar exerting a compressive force on the duct.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
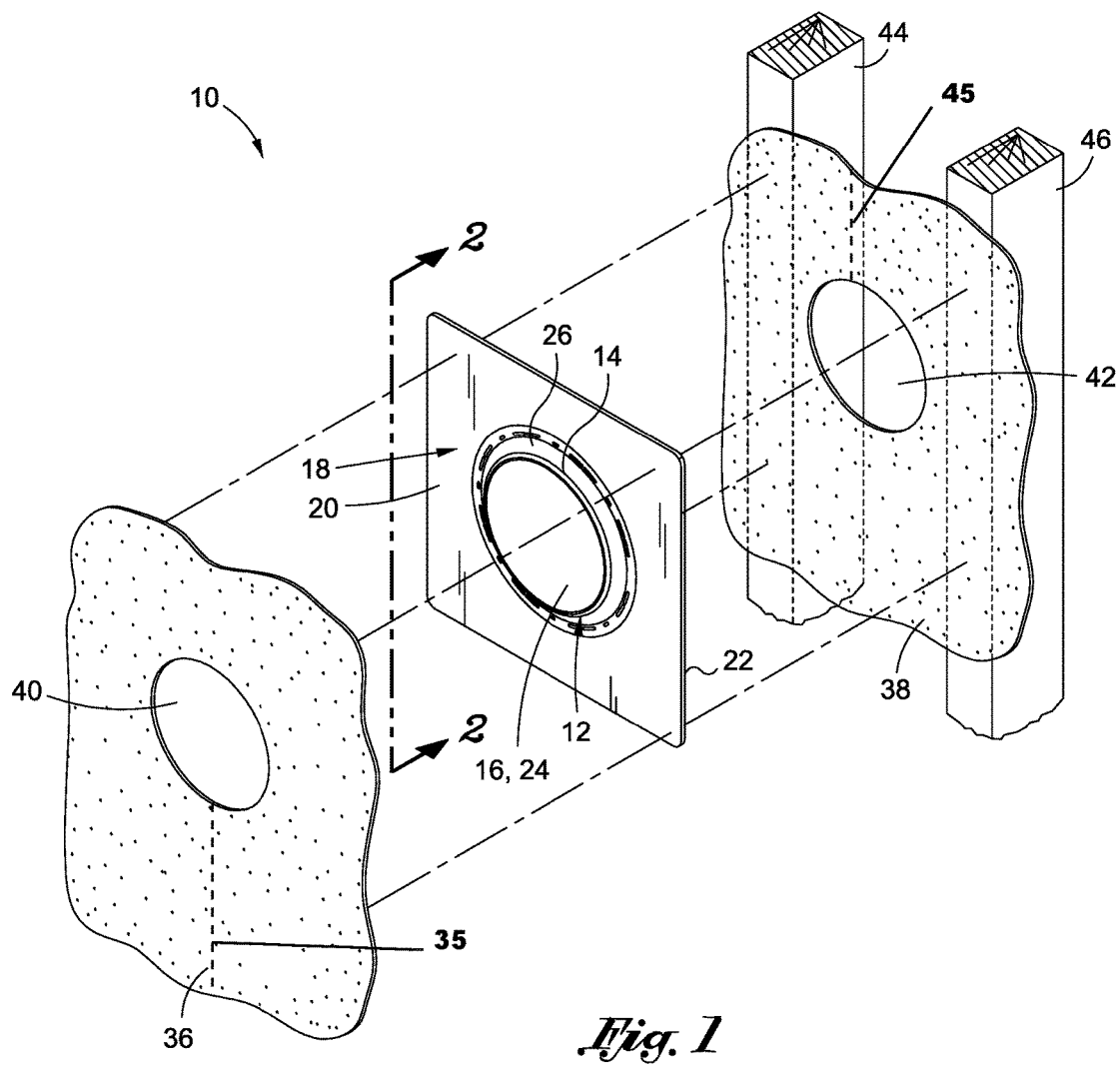
FIG. 1 is an upper perspective view of a duct flashing panel in alignment with front and rear paper sheets and frame members.

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Referring now to the drawings, wherein the showings are for purposes of illustrating a preferred embodiment of the present invention only, and are not for purposes of limiting the same, there is depicted a duct flashing panel 10 configured for use with large diameter single wall ducts, such as heating, ventilation, and air conditioning (HVAC) ducts. The flashing panel 10 includes an elastomeric or polymer seal collar 12 defining a collar opening 16 sized and configured to receive the duct within the opening 16 and to circumferentially engage with the outer surface of the duct to form a substantially fluid-tight seal at the interface of the duct and the collar 12 to prevent fluid (e.g., water), debris or animals from migrating along the exterior of the duct and into the interior of the structure. The collar 12 includes an annular bead 14 disposed about the collar opening 16 to enhance the compressive force applied around the duct to form the substantially fluid-tight seal around the duct.

Figure 3:
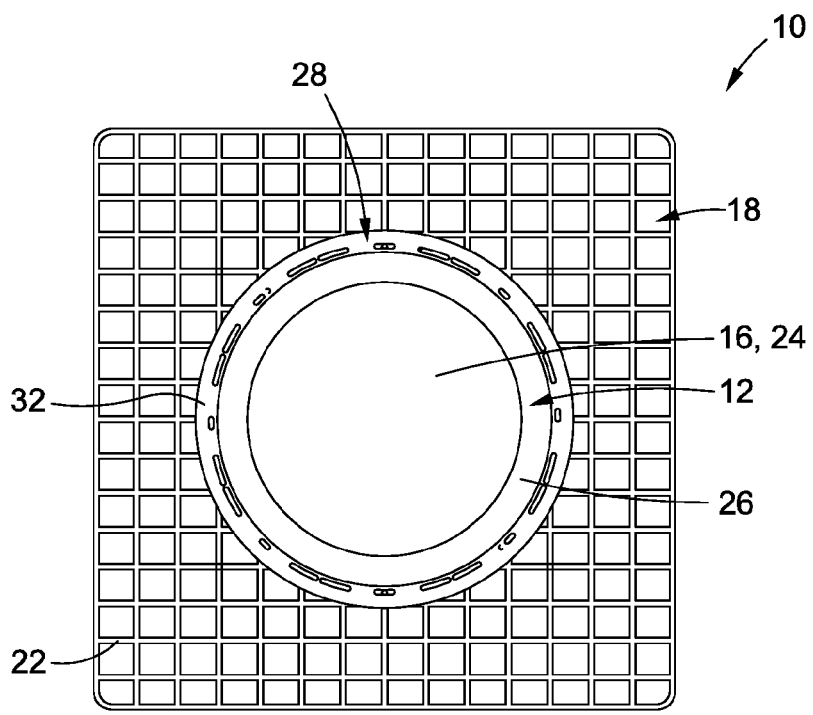
FIG. 3 is a rear elevation view of the duct flashing panel.
Figure 4:
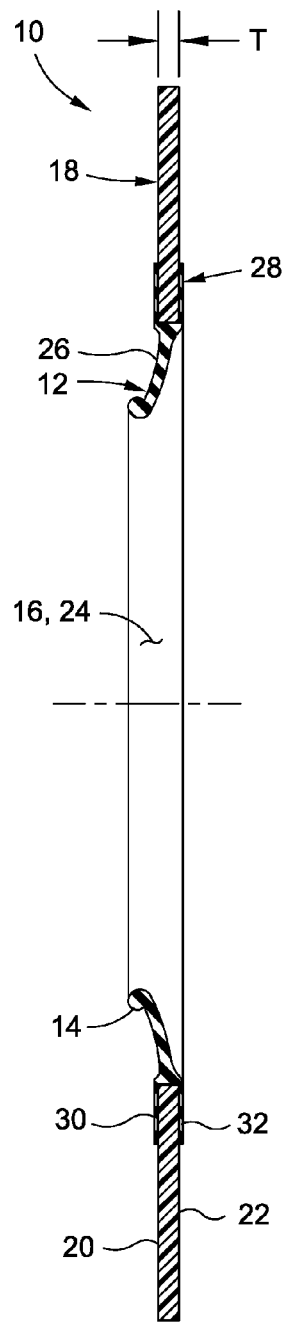
FIG. 4 is a side sectional view of the duct flashing panel depicted in FIG. 2.

The duct flashing panel 10 includes a panel body 18 having a front surface 20 and an opposing rear surface 22 to define a panel thickness, "T" (see FIG. 4) therebetween. The panel body 18 is preferably formed from either a semi-rigid or flexible material, such as plastic, although other materials known in the art may also be used. Various embodiments of the panel body 18 may be more flexible than others, depending on the material used to fabricate the panel body 18. The panel thickness T may vary as desired. If greater rigidity is desired, multiple strengthening ribs may optionally be provided on the panel body 18 as shown in FIG. 3.

Figure 2:
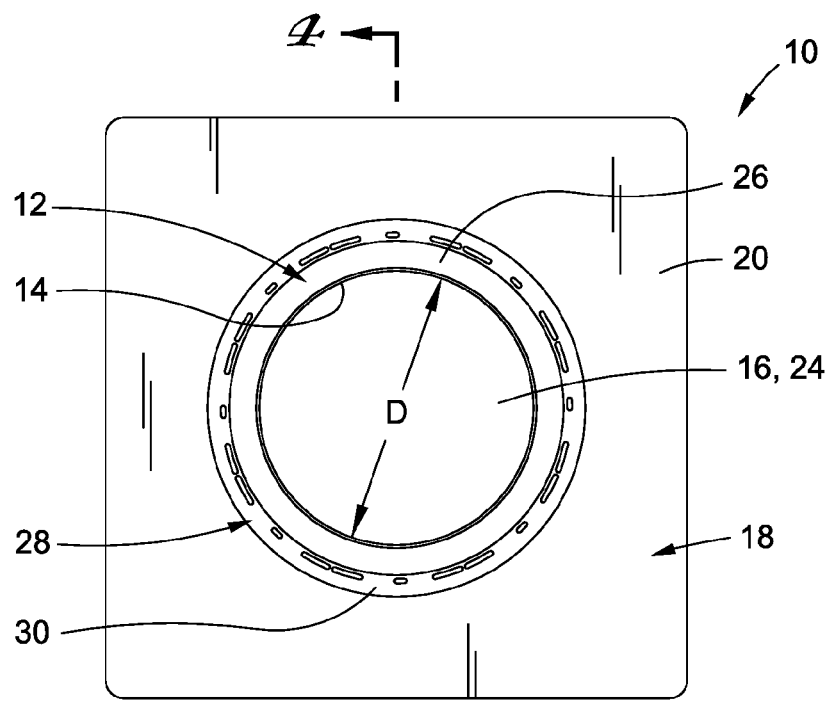
FIG. 2 is a front elevation view of the duct flashing panel.

The elastomeric or seal collar 12 includes an annular collar body 26 defining the collar opening 16 and a collar inner diameter, "D" (see FIG. 2). In one embodiment, the collar inner diameter D is approximately equal to 5.5 inches in a relaxed configuration (e.g., without a duct inserted therethrough) and may be configured to receive a single wall duct that defines an outer diameter of approximately 6 inches. Those skilled in the art will readily appreciate that the size of the inner diameter D may vary depending on the size of the duct that is to be inserted through the collar 12. In this regard, some embodiments of the collar 12 may define an inner diameter D that is larger than 5.5 inches in the relaxed configuration. For instance, some ducts may define an outer diameter of 12 inches or more, and thus, the size of the collar 12 will vary to accommodate the size of the ducts that are to be advanced therethrough.

The elastomeric collar 12 is coupled or formed with to the panel body 18 such that the collar opening 16 is in communication with the panel opening 24, and is preferably coaxially aligned with the panel opening 24. The collar body 26 is formed of an elastomeric material, such as rubber or plastic, although other elastomeric materials and or polymers known by those skilled in the art may also be used without departing from the spirit and scope of the present invention. Furthermore, it is contemplated that the collar body 26 may be formed from a simulated elastomeric material, which is slightly stretchable and biasable to provide a compressive force around the duct.

According to one embodiment, the collar 12 includes an annular attachment element 28 extending radially outward from the collar body 26 to facilitate engagement between the collar 12 and the panel body 18. In one implementation, the annular attachment element 28 includes a first flange 30 (see FIG. 4) and an opposing second flange 32 (see FIG. 4) to define an attachment cavity therebetween. A portion of the panel body 18 is received within the attachment cavity to couple the collar 12 to the panel body 18. The collar 12 may be joined to the panel body 18 via an adhesive, welding, mechanical fasteners, or other joining means known by those skilled in the art.

The collar 12 additionally includes an annular bead 14, preferably disposed adjacent the inner opening 16 to strengthen the fluid-tight engagement between the collar 12 and the duct. As shown, the bead 14 is preferably formed only on the outer surface of the collar 12 so as not to interfere with the water-tight seal formed on the inner surface which contacts to the duct. Along these lines, the annular bead 14 urges the collar 12 into a tight, substantially fluid-tight engagement with the duct. According to one embodiment, the annular bead 14 is approximately ⅛-¼ inches in diameter, although the bead 14 may define other sizes in other embodiments of the present invention.

Figure 5:
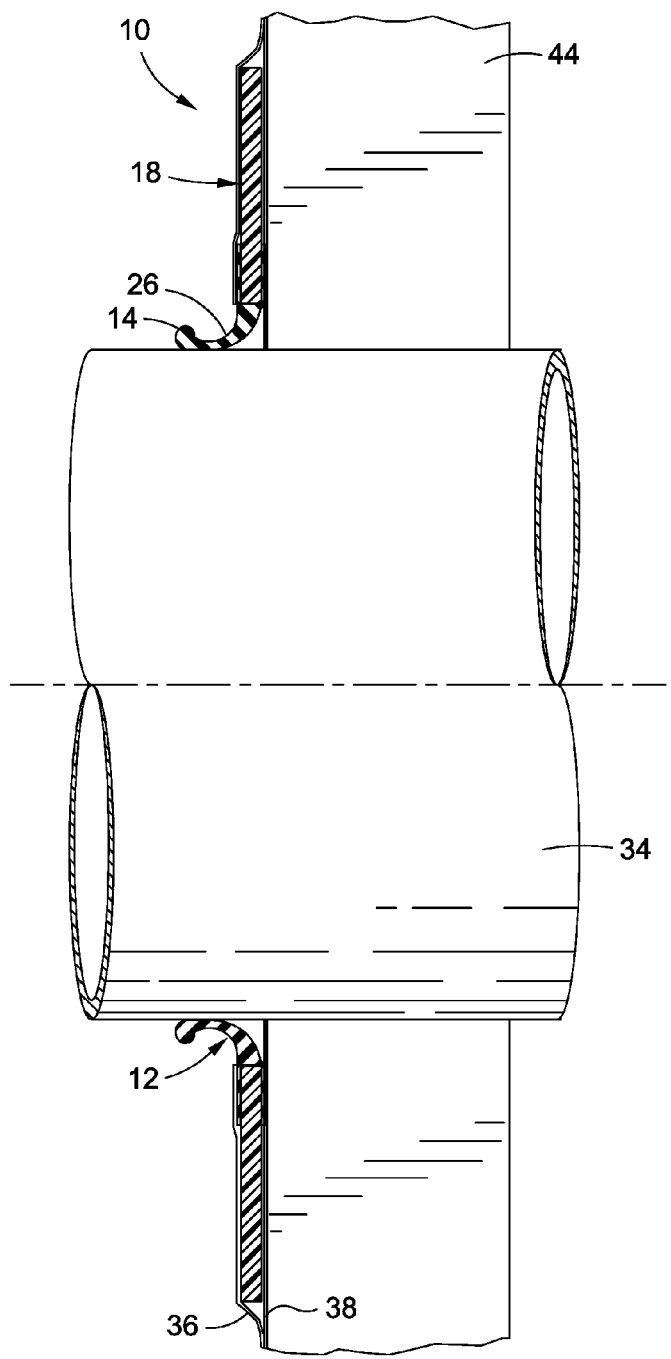
FIG. 5 is a side sectional view of the duct flashing panel coupled to a frame member and having a single wall duct extending therethrough.

According to one aspect of the present invention, the collar 12 is configured to be transitional relative to the panel body 18 between a relaxed configuration (see FIGS. 1-4) and a compressive configured (see FIG. 5), such that the inner collar diameter D increases as the collar 12 transitions from the relaxed configuration toward the compressive configuration. As will be explained in more detail below, insertion of the duct 34 through the collar 12 causes the collar 12 to transition, i.e., stretch, from the relaxed configuration to the compressive configuration. The collar 12 may be biased toward the relaxed configuration such that when the duct 34 is advanced through the collar 12, the biasing force urges the collar 12 into circumferential engagement with the duct 34 to create the substantially fluid-tight seal therebetween. Furthermore, the bead 14 strengthens and maintains the compressive force applied by the collar 12 to the duct 34 to enhance the long term sealing effect of the collar 12.

The duct flashing panel 10 is configured for use with a front WRB or paper sheet 36 as well as a rear WRB or paper sheet 38 to provide additional protection against water migration along the duct 34. Exemplary conventional weather/paper sheets 36, 38 include WRB or housewrap or building paper, although other sheets known in the art may also be employed. The front paper sheet 36 includes a front sheet opening 40 and the rear paper sheet 38 includes a rear sheet opening 42. The front and rear sheets 36, 38 are positioned with the front and rear sheet openings 40, 42 in communication with and aligned with the collar opening 16 so as to allow the duct 34 to be advanced through the front and rear sheet openings 40, 42. The rear sheet 38 is placed adjacent the rear surface 22 of the panel body 18, between the panel body 18 and the frame members 44, 46, while the front sheet 36 is positioned adjacent the front surface 20 of the panel body 18. Each paper sheet 36, 38 may include a respective cut line 35, 45 (see FIG. 1) extending from the respective openings 40, 42 to the peripheral edge of the sheet 36, 38 to facilitate installation of the paper sheets 36, 38 about the duct 34. In additional embodiments, a horizontal slit can be formed in the WRB and the flashing panel body can be slid beneath the WRB and inserted over the duct and affixed to the wall or shear panel (not shown) attached to the frame members 44 and 48. Subsequently conventional tape can be applied over the slit to form a WRB barrier around the flashing panel.

With the primary structural features of the duct flashing panel 10 described above, the following discussion will describe installation of the duct flashing panel 10. The duct flashing panel 10 is preferably installed after installation of the duct 34. The rear WRB or paper sheet 42 is positioned about the duct 34 and is then fastened to adjacent frame members 44, 46 such that the rear sheet opening 42 is positioned in the location where the duct 34 is to be installed. As noted above, the rear paper sheet 42 may include a cut line 45 which allows the rear paper sheet 42 to easily slip around the duct 34. The rear paper sheet 38 is joined to the frame members 44, 46, preferably by a bonding material or agent, although other mechanical fasteners known in the art may also be used.

The panel body 18 is then pushed over the duct 34 and is positioned adjacent the frame members 44, 46 and the rear paper sheet 42. The advancement of the duct 34 through the collar 12 causes the collar 12 to transition from the relaxed configuration toward the compressive configuration. The collar 12 forms a fluid-tight seal against the outer surface of the duct 34 to mitigate fluid migration along the outer surface of the duct 34. The panel body 18 is then secured to the frame members 44, 46 via nails, screws, bolts, adhesives or other fasteners known in the art.

The front paper sheet 36 is then draped over the duct 34 and placed over the panel body 18, with the front paper opening 40 aligned with the collar opening 16. The front paper sheet 36 preferably includes a cut-line 35 to allow the front paper sheet 36 to fit around the duct 34.

According to one embodiment, the collar 12 may be specifically configured and adapted to encourage advancement of the duct 34 through the collar 12 in a specific direction. For purposes of the following discussion, the "advancement direction" will be the direction along an axis that is perpendicular to the rear surface 22, from the rear surface 22 toward the front surface 20. In this regard, the collar 12 may be angled to promote/facilitate advancement in the duct 34 through the collar opening 16 in the advancement direction. The collar 12 may be angled in the advancement direction, e.g., the collar body 26 may extend from the panel body 18 in a direction that is from the rear surface 22 toward the front surface 20. Furthermore, the duct flashing panel 10 may be installed to the frame members 44, 46 such that the collar body 26 is angled toward the outside of the structure.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A method of installing a flashing panel over a duct, the method comprising the steps of:
   placing a first sheet over the duct, with the duct extending through an opening formed in the first sheet;
   advancing the flashing panel over the duct after placing the first sheet over the duct, the flashing panel comprising:
      a panel body having a first surface, an opposing second surface, and a panel opening extending through the panel body between the first and second surfaces;
      a resilient collar coupled to the panel body and extending radially inward into the panel opening, the collar defining a collar opening aligned with the panel opening, the collar being sized and configured to be engageable with the duct and to apply a compressive force thereto when engaged therewith; and
      an annular bead coupled to the collar to enhance the compressive force applied to the duct, the resilient collar extending from the panel body in a radially inward direction relative to the panel body and terminating at the annular bead;
      the duct extending through the collar opening and the collar exerting the compressive force on the duct when the flashing panel is advanced over the duct; and
   placing a second sheet over the duct after the advancing step, with the duct extending through an opening formed in the second sheet,
   the first sheet being disposed adjacent the first surface of the panel body, and the second sheet being disposed adjacent the second surface of the panel body.

2. The method of claim 1, further comprising the step of fastening the first sheet to a frame member.

3. The method of claim 1, wherein upon advancing the flashing panel over the duct, an outer surface of the resilient collar forms a concave configuration.

4. The method of claim 1, wherein the advancing step includes transitioning the resilient collar from a relaxed configuration toward a compressive configuration, the resilient collar defining an inner collar diameter that increases as the resilient collar transitions from the relaxed configuration toward the compressive configuration.

5. The method of claim 1, wherein the advancing step includes advancing the flashing panel over the duct along an axis about which the panel body and the resilient collar are coaxially aligned.

6. The method of claim 1, further comprising the step of securing the panel body to a frame member.

7. A method of installing a flashing panel over a duct, the method comprising the steps of:
placing a first sheet over the duct, with the duct extending through an opening formed in the first sheet;
advancing the flashing panel over the duct, the flashing panel comprising a panel body having a panel body opening and a resilient collar coupled to the panel body and extending from the panel body into the panel body opening, the collar having an annular bead extending around a collar opening coaxially aligned with the panel opening;
applying a compressive force on the duct by the resilient collar to form a seal around the duct;
placing a second sheet over the duct after the advancing step, with the duct extending through an opening formed in the second sheet,
the first sheet being disposed adjacent a first surface of the panel body, and the second sheet being disposed adjacent a second surface of the panel body.

8. The method of claim 7, wherein in the advancing step, the annular bead defines a radially inner-most portion of the resilient collar.

9. The method of claim 7, further comprising the step of fastening the first sheet to a frame member.

10. The method of claim 7, wherein upon advancing the flashing panel over the duct, an outer surface of the resilient collar forms a concave configuration.

11. The method of claim 7, wherein the advancing step includes transitioning the resilient collar from a relaxed configuration toward a compressive configuration, the resilient collar defining an inner collar diameter that increases as the resilient collar transitions from the relaxed configuration toward the compressive configuration.

12. The method of claim 7, wherein the advancing step includes advancing the flashing panel over the duct along an axis about which the panel body and the resilient collar are coaxially aligned.

13. The method of claim 7, further comprising the step of securing the panel body to a frame member.

* * * * *